April 17, 1951     B. E. DEL MAR     2,549,672
CABIN PRESSURE CONTROL
Filed May 16, 1942     3 Sheets-Sheet 3

INVENTOR.
BRUCE E. DEL MAR
BY

ATTORNEY.

Patented Apr. 17, 1951

2,549,672

UNITED STATES PATENT OFFICE 2,549,672

CABIN PRESSURE CONTROL

Bruce E. Del Mar, Los Angeles, Calif., assignor to Douglas Aircraft Company, Inc., Santa Monica, Calif.

Application May 16, 1942, Serial No. 443,233

35 Claims. (Cl. 98—1.5)

My invention relates to means for controlling pressure within aircraft cabins, and relates particularly to means for controlling cabin pressure equipment in a manner which does not impose on the super-charging equipment undue strain which would limit the flight altitude of the aircraft, and is particularly useful in aircraft using centrifugal cabin superchargers.

Superchargers now employed for forcing air into pressure cabins to supercharge the same must be overspeeded to continue airflow delivery when subjected to a compression ratio greatly larger than that for which the superchargers have been designed, and if the optimum compression ratio is greatly exceeded, surging of the airflow, interruption of the airflow and overheating of the air will occur.

It is an object of my invention to provide for use with an aircraft pressure cabin, an air pressure control system having a control device incorporating means for controlling the cabin pressure with reference to the compression ratio existing between the exterior and the interior of the cabin so that the supercharger will not be forced, even at extremely high altitude flight, to operate against a compression ratio beyond the range in which it will give satisfactory service, thereby making it possible to maintain the supercharger system in operation throughout the entire altitude range in which the aircraft is capable of flight without limitation by characteristics of the air supply equipment used.

It is a further object of the invention to provide a cabin pressure control which will avoid the necessity for overspeed driving of cabin pressure air supply equipment when the aircraft is operated above normal flight service ceilings. In keeping with the foregoing objects, it is accordingly an object to avoid the necessity for maintaining reserve power for overspeed driving of the cabin pressure air supply equipment under the conditions expressed in the preceding sentence.

It is a further object of the invention to prevent or avoid serious airflow reduction or surging of centrifugal and other types of compressors employed as an air supply source for pressure cabins, during operation at maximum gear ratios.

A further object of the invention is to make possible an important saving in weight in cabin pressure air supply systems by placing a known maximum value on the compression ratio design requirement and in some cases to eliminate an additional stage of compression in the compressor equipment.

A further object of the invention is to provide an air cabin pressure system wherein there is accomplished a limitation of temperature rise through the air supply blower which is only a function of compression ratio, temperature of the external air, and blower efficiency.

A further object of the invention is to provide an air control system for pressure cabins having means for varying the limiting compression ratio.

A further object is to provide a system of the character described in the preceding paragraph wherein the limiting compression ratio is varied in accordance with the temperature of the outside air. For a supercharger producing a given flow against a given compression ratio, an increase in the temperature of the air which lies outside the pressure cabin and which serves as a source of supply for the blower makes necessary an increase in supercharger speed in order to maintain this flow, but in this system higher temperature is compensated for by a decrease in the compression ratio between the external atmosphere and the interior space of the cabin.

A further object of the invention is to provide a simple unit of small size and light weight for control of the pressure within an aircraft cabin, this unit incorporating means which will limit the compression ratio to which the blower is subjected in accordance with a predetermined schedule established with relation to the characteristics and capacity of the blower and its power source.

A further object of the invention is to provide a simple device for limiting the compression ratio to which the cabin air supply means is subjected, which may be employed with any of the various known or herein identified cabin pressure control devices. For example, the pressure limiting device forming a part of my invention may be used for the control system which held the cabin pressure constant, wherein the cabin pressure is first held constant and is thereafter maintained at a constant differential over atmospheric, wherein the pressure of the cabin is controlled in accordance with rate of pressure change, wherein the cabin pressure is a ratio of the ambient external pressure, or combinations of the foregoing types of pressure cabin control.

A further object of the invention is to provide a system for control of pressure in a pressure cabin, having marked sensitivity to pressure changes by reason of the incorporation therein of an anticipator operative directly from changes in the incoming and outgoing flows of air, thereby avoiding lag in control of pressure where this control responds only to changes in pressure in the cabin, and which system incorporates means for limiting the cabin presure to a value fixed in accordance with a predetermined maximum compression ratio.

A further object of the invention is to provide a system for control of cabin pressure, having control means responsive to the pressure of air which affects the cabin, that is to say, responsive to internal pressure, external pressure or both of them, and means supplementary to or acting directly upon the foregoing control means which will accomplish a limitation on the maximum pressure differential imposed on the cabin so that the compression ratio against which the supercharger must operate will not exceed a predetermined value.

Further objects and advantages of the invention including mechanisms and cooperative elements whereby the broader objects of the invention may be advantageously embodied, will be brought out in the following part of the specification and the drawings, wherein I have shown electrical means for application of energy to move operative parts, without limitation thereto in view of the analogy between electrical and hydraulic power application.

Referring to the drawings which are for illustrative purposes only.

Figure 1:
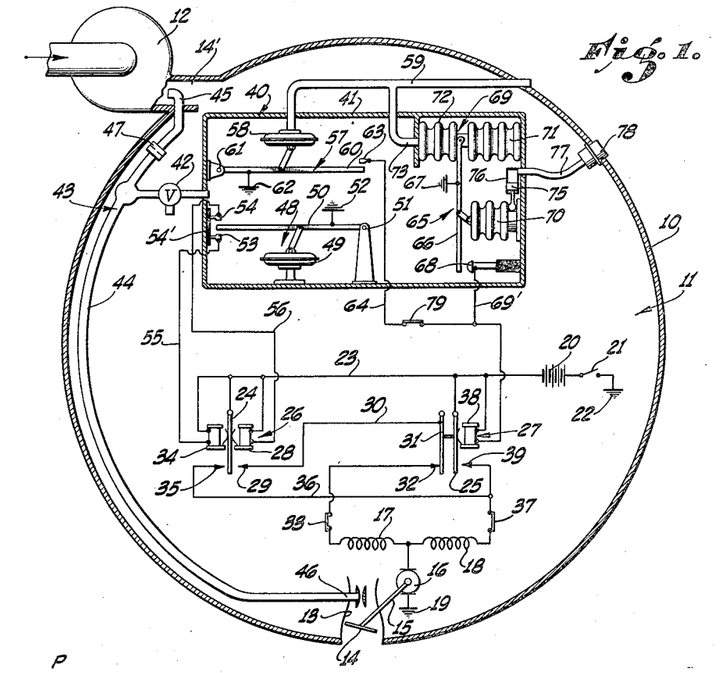
Fig. 1 is a diagrammatic view showing a preferred form of my invention.

In the preferred form of my invention shown in Fig. 1, 10 diagrammatically indicates a pressure cabin having a cabin space 11 into which air is fed by air supply means shown as a supercharger or blower 12. This blower 12 may be of constant speed or variable speed, but it is to be presumed, for the purpose of this disclosure, that at some relatively high altitude the blower 12 will be operated at a maximum speed beyond which the blower will start to surge, overheat, or fail. The cabin is provided with an outlet opening or passage 13 through which air passes from the cabin space 11 under control of a valve 14 in such relation to the inflow of air through the inlet duct 14' that pressure is maintained in the cabin in accordance with a schedule of pressures and pressure relations under control of the control system, which will now be described.

Through suitable transmission, here simply shown merely as a shaft 15, the valve 14 is connected to a reversible motor 16 driven in opposite directions through energization of its windings 17 and 18 so as to close or open the valve 14.

A power source for driving the motor is shown as a battery 20, one side of which is connected through a switch 21 to a ground 22. The other side of the battery 20 is connected through a conductor 23 with contactors 24 and 25 of a double pole relay 26 and a composite relay 27. The contactor 24 is normally held in an intermediate position, as shown in Fig. 1, by suitable spring means. When the winding 28 of the relay 26 is energized, the contactor 24 will be moved into engagement with the contact 29 of a closing circuit 30 which includes a contactor 31, connected to the contactor 25 so as to be moved thereby, and a stationary contact 32 which is connected through a limit switch 33 with the outer end of the closing winding 17 of the motor 16. When the contactor 24 is swung in leftward direction, as the result of energization of the electromagnet 34 of the relay 26, it will connect the battery 20 with the contact 35 of the opening circuit 36, which extends through a limit switch 37 to the opening winding 18 of the motor 16. When the electromagnet 38 of the relay 27 is energized, the contactors 25 and 31 thereof will be moved rightward to carry the contactor 31 out of engagement with the contact 32, thereby opening the closing circuit 30, and carrying the contactor 25 into engagement with a stationary contact 39 connected to the opening circuit 36. Accordingly, when the relay 27 is actuated, it overrides the relay 26, regardless of the position of the contactor 24 of this relay 26, and connects the opening winding 18 of the motor 16 through the contactor 25 with the source of power 20. By suitable energization of the windings of the relays 26 and 27, the motor 16 may be actuated to open and close the valve 14.

The control means shown in Fig. 1 includes a control unit having pressure responsive elements which are exposed to variable pressures and which operate switches associated with the relays 26 and 27. This control unit 40 comprises a practically airtight casing 41 which may be connected through a three-way valve 42 with the cabin space 11 or with an anticipating system 43. This anticipating system 43 includes a duct 44 having one end 45 disposed in the air inlet duct 14' and having its other end 46 exposed in the outlet passage 13, an intermediate portion of this duct 44 being connected to the three-way valve 42 so that the pressure intermediate the ends of the duct 44 may, by proper setting of the valve 42, be transmitted to the interior of the casing. The front end 45 of the duct 44 is shown as an impact tube and the rear end 46 of the duct 44 is shown as a venturi.

As previously mentioned herein, a change in the relation of the inlet and outlet flows of air through the inlet duct 14' and the outlet passage 13 will produce a change in the pressure in the cabin space, but this change in pressure in the cabin space 11 will be relatively slow owing to the large volume of air held therein. The volume of the casing 41 of the control unit is quite small and therefore the changes in its internal pressure due to pressure changes in the duct 44 of the anticipator system will be comparatively rapid. Why this occurs may be explained as follows. Air enters the inlet end 45 of the duct 44 at a pressure corresponding to the velocity of the air through the duct 14' and leaves the outlet end of the duct 44 at a lower pressure which varies with the suction in the venturi 46 resulting from the outlet flow of air through the passage 13. There will be a pressure drop through the duct 44 from the inlet end to the outlet end thereof, and, accordingly, at some intermediate point in this duct, the pressure under normal steady or stabilized conditions of operation will be the same as the pressure in the cabin space 11, but should the relative flows of air through the duct 14' and outlet 14 be changed from their existing values, there will be an immediate change in pressure transmitted through the anticipator system 43 to the casing 41. Should the point of connection of the casing 41 be closer to one end of the duct 44 than the other, or should the friction head of the ducts on the opposite sides of the point of connection be unbalanced, a balancing orifice 47 may be inserted at a suitable point in the duct 44.

For the purpose of further disclosure of the invention, it may be assumed that the pressure existing in the casing 41 of the unit 40 is cabin pressure. On the other hand, it may be made in fact exactly cabin pressure by adjusting the three-way valve 42 so that it will connect the cabin space 11 directly with the interior of the casing 41. Within the casing 41 there is a constant pressure control element 48 comprising an aneroid 49 which moves a control member 50 in accordance with changes in pressure in the casing 41. This member 50 comprises a moving contactor hinged at 51 and being electrically grounded as at 52. On opposite sides of the free end of the member 50 there are contacts 53 and 54 which may be respectively referred to as the opening and closing contacts. These contacts 53 and 54 may be adjustably mounted, as by means of a vertically adjustable block 54', so that they may be moved upwardly or downwardly from the position in which they are shown, whereby control will be exercised with reference to other cabin pressures than those which will be herein referred to for the purpose of explanation. The contacts 53 and 54 may be positioned so that when the pressure in the casing 41 is at a selected value, for example, 22 inches Hg, the contactor 50 will lie in an intermediate position between them. Should pressure within the casing 41 then increase, the aneroid 49 will be reduced in vertical dimension and the contactor 50 will be moved downward into engagement with the valve opening contact 53, whereupon current will be fed through a conductor 55 to energize the electromagnet 34 of the relay 26 and move the contactor 34 into engagement with the contact 35, whereupon the winding 18 of the motor 16 will be energized, to rotate the motor in a direction to open the valve 14 and thereby increase the rate of air outflow through the passage 13.

Returning now to the control unit 40, should there be a drop in pressure within the casing 41, expansion of the aneroid 49 will move the contactor 50 into engagement with the closing contact 54 and the current will be fed through a conductor 56 to the electromagnet 28 of the relay 26, moving the contactor 24 into engagement with the contact 29 to energize the winding 17 of the motor, whereupon a closing movement of the valve 14 and a restriction of the outflow of air from the cabin space 11 will be accomplished.

To override the action of the control 48, when the aircraft rises above the elevation for which the control 48 is adjusted, I provide a pressure differential control 57 comprising a member 58 which is responsive to the pressure differential existing between the interior and the exterior of the cabin 10. This member 58 comprises a capsule, the exterior of which is exposed within the casing 41 and the interior of which is connected through a duct 59 with ambient flight pressure exterior of the cabin 10. The movable wall of this capsule 58 is connected through a suitable link with a contactor arm 60 hinged at 61 and electrically grounded as indicated at 62. Above the free end of the contactor 60 there is a contact 63, which may be adjustably mounted, but which is so positioned with relation to the contactor 60 that it will be engaged by the arm 60 when the pressure differential between the cabin interior and the outside atmosphere reaches a prescribed value determined in accordance with factors including the strength of the cabin shell. When this occurs, current will flow from the contactor 60 through the override circuit 64 to the override relay 27, energizing the electromagnet 38 thereof so that the contactors 25 and 31 will be moved rightward from the positions in which they are shown, this movement energizing the winding 18 of the motor 16 as previously described with relation to the action of the override relay 27.

The control unit 40 also includes a compression ratio control means 65 which is responsive to variations in absolute cabin pressure and variations in ambient flight absolute pressure exterior to the cabin. The control means 65 has a contactor lever or arm 66 grounded as indicated at 67 and adapted to engage a stationary or adjustable contact 68. This contactor arm 66 is movable by means 69 which is actuated by absolute ambient flight pressure, and by an element 70 which is actuated by absolute cabin pressure or the simulated substantial equivalent thereof represented by the pressure in the casing 41 of the unit 40. The element 69 comprises an evacuated capsule 71 in axial alignment with a capsule 72 having its exterior exposed to the pressure within the shell 41 and its interior connected to ambient flight pressure through a tube 73 which connects to the duct 59. The element 70 comprises an evacuated capsule or aneroid mounted within the casing 41 and expanding and contracting in accordance with changes in the absolute pressure existing within the casing 41. The upper end of the contactor arm 66 is connected between the capsules 71 and 72 of the means 69 and an intermediate portion of the arm 66 is connected to the capsule 70.

The contact 68 is positioned with relation to the lower end of the contactor arm 66 with regard to the limiting pressure differential under which the pressure system of the aircraft cabin is to operate. Accordingly, when this compression ratio is below the selected limiting value, the movable contactor arm is out of engagement with the contact 68. An increase in cabin pressure will reduce the axial dimension of the capsule 70 and thus carry the lower end of the arm 66 toward the contact 68. Likewise, a reduction in the pressure outside the aircraft cabin will be transmitted through the duct 59 to the interior of the capsule 72, causing the same to decrease in size, thereby moving the upper end of the arm 66 in counterclockwise direction so that its lower end will be moved toward the contact 68. When the compression ratio limit is reached, the lower end of the contactor arm 66 will have been moved into engagement with the contact 68 so that current will be caused to flow through a conductor 69' which connects with the electromagnet 38 of the relay 27. This will result in energization of the winding 18 of the motor 16 so that the valve 14 will be opened to permit an increase in the rate of flow of air from the cabin space, thereby reducing the absolute cabin pressure to which the compression ratio control 65 is subjected. The effect of the foregoing is to prevent the compression ratio of the pressure in the cabin space 11 to the pressure in the space external to the cabin from exceeding a predetermined value within which suitable operation of the blower 12 is obtainable.

The invention includes means for lowering the compression ratio in response to rise in temperature of the external air, comprising means for relative adjustment of the contactor 66 and the capsule 70. This relative adjustment is accomplished by movement of the capsule 70 toward and away from the capsule 71 in response to changes in temperature in the external air. The capsule 70 is connected to a plunger 75 extending into a cylinder 76 connected by a fluid filled tube 77 with a fluid filled chamber 78 exposed to temperatures existing outside the aircraft cabin. The expansion and contraction of the fluid in the chamber 78 is transmitted through the tube 77 to the cylinder 76 wherein it acts to move the plunger 75 and the capsule 70 in accordance with the rise and fall of outside temperature.

Figure 2:
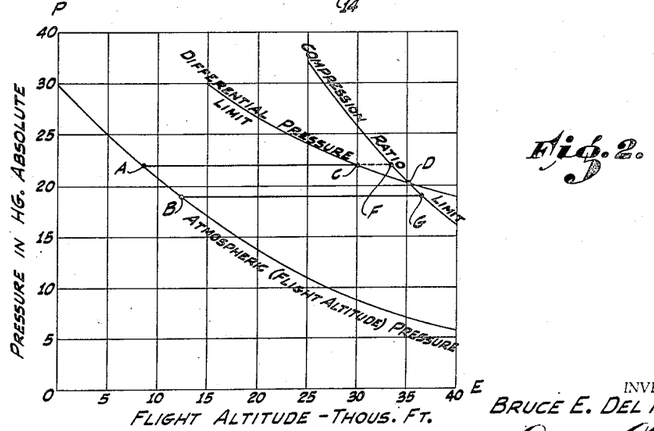
Fig. 2 is a diagram or chart for use in explaining characteristics of the invention.

The operation of the invention may be explained with relation to the chart shown in Fig. 2, wherein the length of the horizontal line O—E represents a change in altitude from zero or sea level to 40,000 feet and the line O—P is laid off to indicate the corresponding atmospheric pressure in inches of Hg. On this chart we have indicated atmospheric flight altitude-pressure relation, or, in other words, the altitude-pressure relation of the normal external atmosphere. In Fig. 2 I have also indicated a differential pressure curve such as would be maintained by the differential control 57, and a compression ratio curve such as produced by the operation of the compression ratio control 65. When the flight of the aircraft is started from a low level, for example, substantially sea level, the pressure in the cabin as seen from the graph, Fig. 2, will be around 30 inches Hg and at this time the contactor 50 will be in engagement with the valve opening contact 53. If the switch 21 is then closed so as to energize the electrical system, the motor 16 will be operated to open the outlet valve 14 to its fullest extent whereupon operation of the motor will be stopped by the opening of the limit switch 37. Since the disclosure is diagrammatic, the mechanical connection of the limit switches 33 and 37 with the shaft 15 of the motor has not been shown, especially since the use of limit switches with electrically driven parts is well known. It will be understood that any known means for opening the limit switches 33 and 37 at the ends of the range of movement of the valve 14 may be employed.

As the ship climbs, there will be a gradual reduction in atmospheric pressure, which reduction in pressure will be duplicated within the cabin space 11 for the reason that at this time the blower 12 is merely circulating air through the cabin. As an altitude of about 8,000 feet is approached, the reduction in pressure within the casing 41 will result in an expansion of the aneroid 49 to lift the contactor 50 from engagement with the contactor 53 into engagement with the contact 54 and the constant pressure control 48 will then act to operate the electrical system associated with the motor 16 in such manner that the valve 14 will be gradually closed as upward flight continues, thereby maintaining in the cabin space a constant pressure of about 22 inches Hg until the differential control 57 comes into operation, as indicated by the horizontal line A—C of Fig. 2. The action of the differential control 57 will be to control the override switch 27 so as to accomplish an opening of the outlet valve 14 to produce a drop in the cabin pressure as indicated by the line C—D of Fig. 2, forming a short section of the differential pressure curve. As the flight altitude corresponding to the point D is reached, the contactor arm 66 of the compression ratio control will be moved into engagement with the contactor 68, whereupon control of the override switch 27 will be exercised by the compression ratio control means 65 and the cabin pressure will be maintained at the values indicated by that portion of the compression ratio curve lying to the right of the point D, during further increase in the flight altitude of the craft.

Should the compression ratio control 65 be adjusted so as to establish a relatively low compression ratio limit, such as represented by the compression ratio curve in Fig. 2, the differential pressure control 57 may be disconnected from the system by the opening of the switch 79 in the conductor 64. Then the constant pressure control 48 will control the cabin pressure as indicated by the line A—F until the compression ratio limit indicated by the compression ratio curve is reached, at which time the control will be taken over by the compression ratio control means 65. Also, the constant pressure control 48 may be set, as by raising the contacts 53 and 54 from the positions in which they are shown, so that the compression ratio control will not start to function until the altitude indicated at B is reached, with a corresponding pressure of about 19 inches Hg. The constant pressure control will then be maintained as indicated by the line B—G until the compression ratio is reached at the point G, control of the cabin pressure then being taken over by the compression ratio control 65, without any use of the differential pressure control 57.

Figure 3:
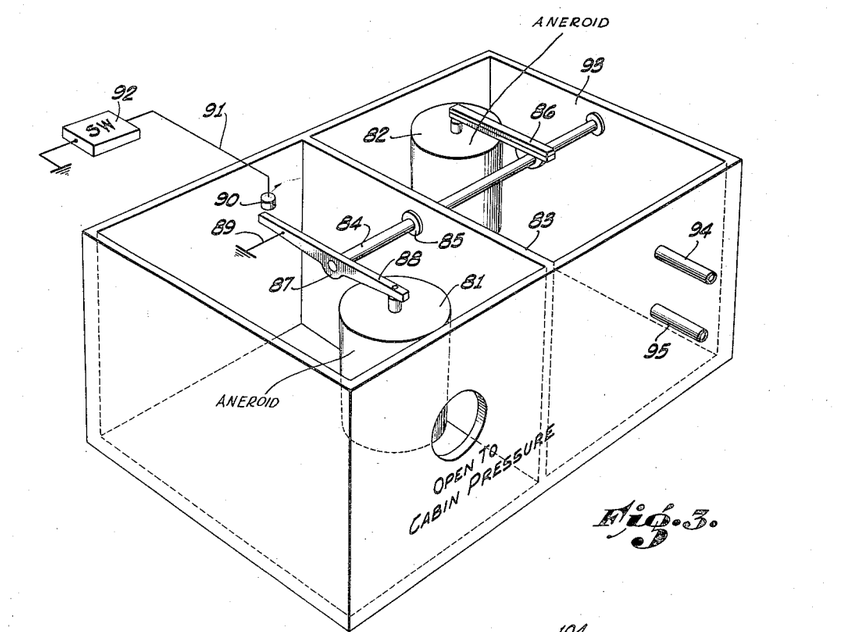
Fig. 3 is a perspective view showing an alternative form of my compression ratio limiting device.

In Fig. 3, I show an alternative form of my compression ratio control device which is intended to replace the compression ratio control device 65. This alternate form of the device comprises a member 81 which is responsive to cabin pressure changes and a member 82 which is responsive to flight altitude pressure changes. The members 81 and 82 are both aneroids comprising hollow metal bodies which are expansible and contractible axially. These hollow bodies, and also the other aneroids shown in the drawings, are contracted by evacuation, against the spring action of the metal walls thereof tending to resist contraction, or against spring means applied for this purpose.

The aneroid 81 is exposed to cabin pressures so that it will expand as the pressure within the cabin decreases. The aneroid 82 is exposed to ambient flight pressure so as to expand in accordance with reduction in external atmospheric pressures. The aneroids 81 and 82 lie on opposite sides of a wall 83 through which a shaft 84 extends, this shaft 84 extending through an opening 85 in the wall which is of such size that the leakage therethrough will be very small. One portion of the shaft 84 is connected to the top of the aneroid 82 by means of a bi-metallic thermostatic arm 86. The portion of the shaft 84 lying on the opposite side of the wall 83 supports a fulcrum arm 87 having the forward portion 88 thereof connected to the aneroid 81. The movement of the fulcrum arm 87 is an index of the changes in or existing compression ratio effective between the exterior and the interior of the cabin. Its changes in position may be used to control the operation of the airflow equipment of the pressure cabin in exactly the same manner as does movement of the contactor arm 66 in the earlier described embodiment of my compression ratio control device. A simple method of doing this is to employ the arm 87 as part of a switch, and accordingly I have shown the arm 87 grounded at 89 so that it will serve as a contactor to engage a contact 90 connected by a conductor 91 with switch means 92. The chamber 93 containing the aneroid 82 receives a continuous flow of external air through inlet and outlet pipes 94 and 95. Accordingly, the temperature in this chamber 93 changes in accordance with the temperature of the air exterior of the aircraft and the bi-metallic arm 86 flexes in accordance with these changes in temperature and modifies the compression ratio in accordance with temperature changes.

In the compression ratio control shown in Fig. 4 which again is to take the place of control device 65, I provide a small evacuated chamber 96 having therein resilient capsules 97 and 98 connected through means 99 with a switch lever 100, so that the action of the capsules 97 and 98 will be to move the switch lever 100 in opposite directions. This switch lever 100 is hinged at 101 and is grounded as indicated at 102. A contact 103 is disposed adjacent the swinging end of the lever 100 so as to be engaged by this lever when it is moved in the direction of the capsule 97. The capsule 97 is connected through a tube 104 with ambient flight pressure and the capsule 98 is connected through a tube 105 with cabin pressure. The capsules 97 and 98 expand and contract in accordance with and under control of the changes in flight and cabin absolute pressures, and the arm 100 is moved through positions corresponding to the compression ratio or, in other words, the ratio of the absolute pressures to which the chambers of the capsules 97 and 98 are subjected.

Figures 4, 5:
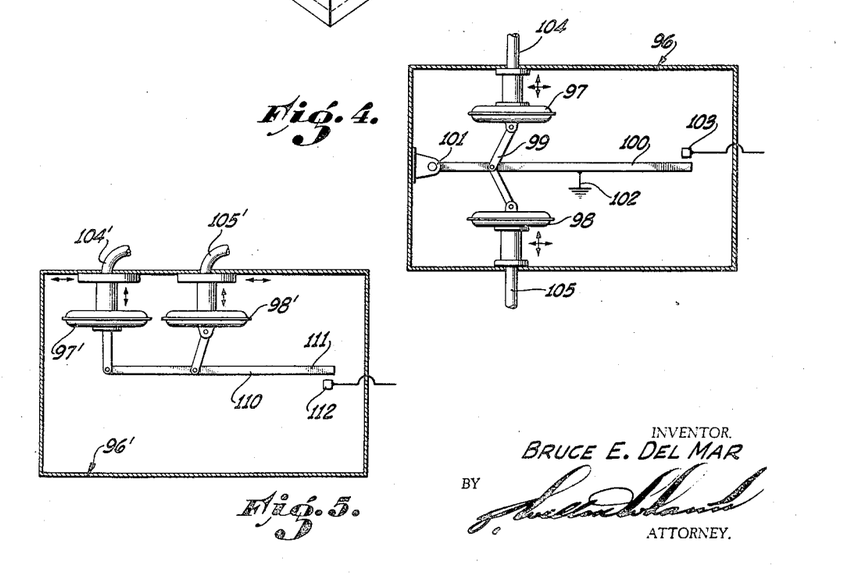
Fig. 4 is a schematic view showing another form of my compression ratio limiting device.
Fig. 5 is a schematic view showing still another form of my compression ratio limiting device.

The form of compression ratio control shown in Fig. 5 is similar to the one shown in Fig. 4, in that it has an evacuated shell 96', but differs in the provision of capsules 97' and 98' in side by side or parallel relation. These capsules 97' and 98' are respectively connected through ducts 104' and 105' with ambient flight pressure and cabin pressure. The movable walls of these capsules 97' and 98' are connected to spaced points of a contactor lever 110. A decrease in ambient flight pressure or an increase in cabin pressure will cause the free end 111 to move downward toward the contact 112 associated with an electrical control circuit. The position of the lever 110 at any time corresponds to the existent compression ratio, and the contact 112 is placed so that it will be engaged when a prescribed compression ratio limit is reached. It will be understood that temperature compensation means may be applied to devices shown in Figs. 4 and 5 in accordance with the teachings found in Figs. 1 and 3.

Figure 6:
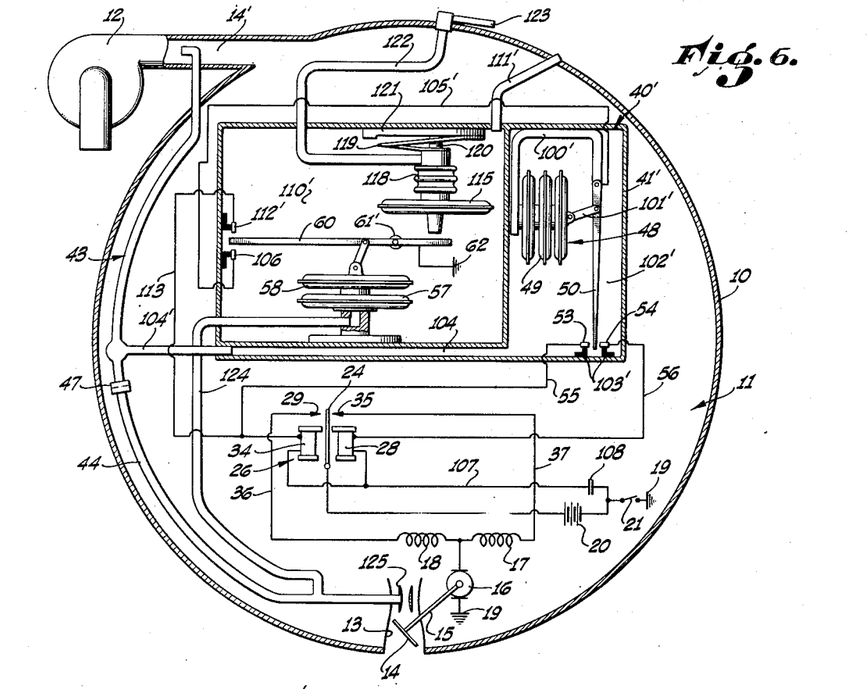
Fig. 6 is a schematic view showing a cabin control system wherein objects of the invention are attained in a reduced assemblage of cooperating elements.

In the form of the invention previously described, the compression ratio limitation has been accomplished by use of an instrument independent of the cabin pressure regulator, making it possible to vary the cabin pressure regulation without such regulation affecting the compression ratio control instrument. In Fig. 6, I show a form of my invention wherein the compression ratio limitation is accomplished by means supplementary to the cabin pressure regulator when it is designed or factory adjusted to operate at predetermined values.

In Fig. 6 those parts which are the same as previously shown in Fig. 1 will be referred to by the same numbers. Within the cabin space 11 there is a control unit 40' having a casing 41' having at the rightward end thereof a constant pressure regulator 48 comprising an aneroid 49 mounted on a bracket 100' to which a contactor 50 is hinged. Through a link 101', the expansion and contraction of the aneroid 49, in response to differences in pressure in the chamber 102', will swing the contactor 50 back and forth between opening and closing contacts 53 and 54 adjustably mounted for lateral movement by means of insulators 103'. The chamber 102' receives anticipated cabin pressure variations by reason of its connection through a duct 104' with the anticipator system 43. The contactor 50 is energized through a conductor 105' only when the contactor 60 of the differential pressure regulator 57 is in lowered position so as to engage a contact 106 to which one end of the conductor 105' is connected, the contactor 60 then connecting a ground 62 with the contactor 50 through the contact 106 and the conductor 105'. Accordingly, prior to the time the differential pressure control comes into operation as the result of the expansion of its capsule 58, the contactor 50 of the cabin pressure constant control 48 will be connected with the ground, and by contact with either of the contacts 53 or 54, will complete circuits 55 and 56 through either the electromagnet 34 or the electromagnet 28 of the double pole relay 26, these circuits being completed through a conductor 107 extending to a low voltage power source such as a battery 108 which is connected through the switch 21 with the ground 19. Accordingly, the movement of the contactor 50 as previously described will energize the relay 26 so that either the opening circuit 36 or the closing circuit 37 associated with the motor 16 will be energized from the power source 20 as the result of the contactor 24 being moved into engagement with the respective contacts 29 and 35 of the relay 26.

The contactor 60 is carried by a hinge 61' placed intermediate its ends, and when the pressure drop of the ambient atmosphere transmitted to the chamber 110 of the casing 41' through a duct 111', or a rise in the pressure within the capsule 58 lifts the contactor 60, the contactor 50 will be disconnected from the ground so that the constant pressure control 48 will be no longer energized. Expansion of the capsule 58 will move the contactor 60 into engagement with the contact 112' which is connected through a conductor 113 with an electromagnet 34 of the relay 26. This will cause a leftward swinging of the contactor 24 so that the opening circuit 36 of the motor 16 will be energized.

During the operation of the differential control 57, there will be a gradual expansion of an aneroid 115 in accordance with the reduction in ambient flight pressure transmitted through the duct 111' to the chamber 110'. This aneroid 115 is disposed above and in cooperative relation to the rightward end of the lever forming the contactor 60, and when the compression ratio limit is reached, the downward force of the aneroid 115 will supplement the upward force of the capsule 58, so that the contactor 60 will then act in cooperation with the contact 112'.

The aneroid 115 has associated temperature responsive control means shown as a fluid filled bellows 118 acting as a means for connecting the aneroid 115 to an adjustable support 119 having a screw 120 whereby the assemby of bellows 118 and aneroid 115 may be moved vertically, and also having a laterally slidable base 121 for lateral adjustment of the assembly. The bellows 118 is connected through a tube 122 with a gas or liquid filled tube or bulb 123 disposed so that it will be affected by temperature of external air. To provide enhanced sensitivity, the bellows 58 of the differential pressure control 57 is connected through a duct 124 with the anticipator system 43 at a point near the outlet venturi 125 to which the outlet end of the anticipator duct 44 is connected.

In the operation of the device shown in Fig. 6 pressure control is accomplished which may be readily explained with relation to the chart Fig. 2. When the aircraft is at an altitude below the point A, the capsule 58 will be relatively compressed or collapsed and therefore the contactor 60 will be in engagement with the contact 106. Also, the aneroid 49 of the constant pressure control will be collapsed and the contactor 50 thereof will be in engagement with the contact 53, with the result that the relay 26 will be energized so as to close the opening circuit 36 associated with the motor 16 and the outlet valve will be open.

As the flight altitude is increased toward the point A, the aneroid 49 will gradually expand so that at the point A the contactor 50 will be moved rightward into engagement with the contact 54, thereby actuating the electrical control so as to operate the motor in a manner to gradually close the outlet valve and maintain the cabin pressure substantially constant as indicated by the line A—C. When the point C is reached, the expansion of the capsule 58 will have caused lifting of the contactor 60 into engagement with the contact 112', whereupon the control of the cabin pressure will be then by the differential pressure control 57, and this differential control will be maintained as indicated by the line C—D between the respective flight altitudes thereby indicated. At the flight altitude D, expansion of the aneroid 115 will have accomplished pressural engagement thereof with the rightward or rear end of the contactor 60, this supplementary pressure then causing the cabin control to follow approximately along the compression ratio curve rightward from the point D.

Figure 7:
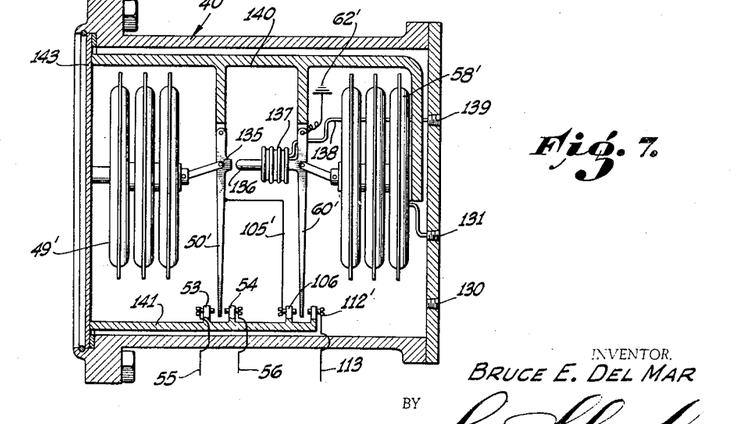
Fig. 7 is a sectional view showing an alternative form of pressure responsive regulator which may be used in the system disclosed in Fig. 6.

In Fig. 7, I show another means whereby the compression ratio limitation can be added to the cabin regulator, thereby avoiding use of a separate compression ratio control such as shown in Fig. 1. The control unit shown in Fig. 7 may be substituted in the system shown in Fig. 6 for the control unit 40'. It has contacts 53, 54, 106, and 112' which are connected into the electrical system of Fig. 6 in the manner shown therein. The casing of the unit shown in Fig. 7 has a port 130 whereby its interior may be connected through the duct 104' of Fig. 6 with the anticipator system 43, the duct 124 being entirely omitted. The casing likewise has a port 131 for connection with the duct 111' which will then transmit ambient flight pressure to the capsule 58' which moves a contactor arm 60' between contacts 106 and 112', thereby controlling the cabin pressure in accordance with differential in its proper sequence, as will be brought forth hereinafter. Within the casing of the unit there is an aneroid 49' which moves the contactor arm 50' between contacts 53 and 54 so as to produce a constant pressure control of the cabin altitude or internal atmosphere in the same manner as the contactor arm 50 of Fig. 6. It will be noted that the contact 106 is connected through a conductor 105' with the contactor arm 50', so that this arm will not be connected to ground 62' when the contactor 60' is moved from engagement with the contact 60' as the result of the increase in the pressure differential acting externally of the capsule 58' which corresponds to the capsule 58 of Fig. 6, with the exception that in Fig. 7 the interior of the capsule is exposed to ambient flight pressure and the exterior is exposed to cabin pressure through the anticipator system, in reverse of Fig. 6.

When flight altitude is below the value A, Fig. 2, the contactor arm 60' will be in engagement with the contact 106 and the collapsed condition of the aneroid 49' will hold the contact arm 50' in engagement with the contact 53, the result being that the outlet valve will be maintained in open position. As the altitude A is reached, reduction in cabin pressure will result in expansion of the aneroid 49' and the contactor arm 50' will be moved toward the contact 54 and by cooperation with the contact 54 a constant cabin pressure will be maintained, as indicated by the line A—C of Fig. 2. At the point C of Fig. 2, the contactor arm 60' will move away from the contact 106 and will thereafter cooperate with the contact 112' to control the cabin at the differential pressure C—D. The contactor arm 50' is characterized by flexibility or yieldability so that as the flight altitude rises, the expansion of the aneroid 49' will flex the intermediate portion of the contactor arm 50' rightward after the lower end thereof engages the contact 54. The result of this continued flexure is that a projection 135 on the contactor arm 50' will engage a projection 136 which is carried by the contactor arm 60', so that expansion of the aneroid 49', when the point D is reached, will transmit pressure through the projection 135 to the contactor arm 60', to supplement the action of the capsule 58' and produce a control of cabin pressure along the compression ratio curve of Fig. 2 rightward from the point D.

The interconnection between the aneroid 49' and the contactor arm 60' embraces a regulation responsive to external temperature variations. This regulation is shown as an expansible fluid filled bellows 137 forming a part of the projection 136, this bellows being connected through a flexible tube 138 with a port 139 which may be connected to the tube 122 leading to the tube or bulb 123 shown in Fig. 6. Accordingly, the temperature of the external air rises, an expansion of the bellows 137 is produced so that cooperation of the aneroid 49' to produce compression ratio control occurs at a lower point in the flight altitude, with the result that the compression ratio limit is reduced from its previous value.

The casing of the device shown in Fig. 7 has a cover 143 carrying on its inner face brackets 140 and 141 for carrying the active parts of the instrument; thereby it is possible by removal of the cover to remove the operating parts of the device from the casing.

I claim as my invention:

1. In a system for air-supercharging a cabin, the combination of: supercharging means for the cabin comprising means for delivering a flow of air into the cabin and emitting a flow of air from the cabin, the relative values of these flows determining the pressure within the cabin; means for controlling the operation of said supercharging means comprising means responsive to the pressure of air affecting said cabin to control said supercharging means through a range of external pressures to which said cabin is exposed; a compression ratio control having a part movable through consecutive positions representative of consecutive compression ratios, means operating in response to changes in absolute pressure within said cabin to apply a force to move said part, and in cooperating therewith means operating in response to absolute pressure outside said cabin to apply a force to move said part; and means whereby said movable part effects control of said controlling means so that the pressure of air in said cabin will at no time exceed a predetermined multiple of the absolute pressure of air outside said cabin.

2. In a device for air-supercharging an aircraft cabin, the combination of: air supply means for delivering a flow of air under pressure into the interior of the cabin; variable flow outlet means for emitting air from the interior of the cabin; motivating means to actuate said outlet means, said motivating means including a source of energy which is utilized to operate the motivating means; means acting in response to changes in air pressure affecting said cabin to control the application of said energy in said motivating means; a pressure change sensitive element movable in response to changes in absolute pressure within said cabin; a pressure change sensitive element movable in response to changes in ambient absolute pressure; a member receiving movement from said elements in such manner that its movement is in accordance with changes in the ratio of the absolute pressures within and outside said cabin; and means operated by said member for controlling the application of energy in said motivating means to actuate said outlet means so that the absolute pressure within said cabin will be maintained within the limits of a fixed proportion of the absolute pressure exterior of said cabin.

3. In a system for air-supercharging an aircraft cabin, the combination of: air supply means for delivering a flow of air into the interior of the cabin; variable flow outlet means for emitting air from the interior of the cabin; motivating means to actuate said outlet means, said motivating means including a source of energy which is utilized to operate the motivating means; means acting in response to changes in air pressure affecting said cabin means; means responsive to absolute pressure within said cabin and absolute pressure exterior thereof controlling the application of energy in said motivating means to actuate said outlet means so that the absolute pressure within said cabin will be maintained within the limits of a fixed proportion of the absolute pressure exterior of said cabin; and means responsive to the temperature of air exterior of said cabin for varying the action of said means responsive to absolute pressure to vary said proportion.

4. In a system for air-supercharging an aircraft cabin, the combination of: air supply means for delivering a flow of air into the interior of the cabin; variable flow outlet means for emitting air from the interior of the cabin; motivating means to actuate said outlet means, said motivating means including a source of energy which is utilized to operate the motivating means; means acting in response to changes in air pressure affecting said cabin to control the application of said energy in said motivating means; an element movable in response to changes in absolute pressure within said cabin; an element movable in response to changes in absolute pressure outside said cabin; a member receiving movement from said elements in such manner that its movement is in accordance with changes in the ratio of the absolute pressures within and outside said cabin; means operated by said member for controlling the application of energy in said motivating means to actuate said outlet means so that the absolute pressure within said cabin will be maintained within the limits of a fixed proportion of the absolute pressure exterior of said cabin; and means responsive to the temperature of air exterior of said cabin for varying the action of said means responsive to absolute pressure to vary said proportion.

5. In a system for air-supercharging a cabin, the combination of: supercharging means for the cabin comprising means for delivering a flow of air into the cabin and emitting a flow of air from the cabin, the relative values of these flows determining the pressure within the cabin; means for controlling the operation of said supercharging means comprising means responsive to the pressure of air affecting said cabin to control said supercharging means through a range of external pressures to which said cabin is exposed, and means responsive to absolute pressure inside and outside said cabin to limit the action of said supercharging means so that the absolute pressure of air in said cabin will not exceed a predetermined multiple of the absolute pressure of air outside said cabin; and means responsive to changes in temperature for changing the value of said predetermined multiple.

6. In a device for air-supercharging an aircraft cabin, the combination of: air supply means for delivering a flow of air under pressure into the interior of the cabin; variable flow outlet means for emitting air from the interior of the cabin; motivating means to actuate said outlet means, said motivating means including a source of energy which is utilized to operate the motivating means; means acting in response to changes in air pressure affecting said cabin to control the application of said energy in said motivating means; and a control means comprising an aneroid responsive to absolute pressure inside said cabin and an aneroid responsive to absolute pressure outside said cabin operatively interconnected to control the application of energy in said motivating means to actuate said outlet means so that the absolute pressure within said cabin will be maintained within the limits of a fixed proportion of the absolute pressure exterior of said cabin.

7. In a system for air-supercharging an aircraft cabin, the combination of: air supply means for delivering a flow of air into the interior of the cabin; variable flow outlet means for emitting air from the interior of the cabin; motivating means to actuate said outlet means, said motivating means including a source of energy which is utilized to operate the motivating means; means acting in response to changes in air pressure affecting said cabin to control the application of said energy in said motivating means; a control comprising an aneroid responsive to absolute pressure inside said cabin and an aneroid responsive to absolute pressure outside said cabin controlling the application of energy in said motivating means to actuate said outlet means so that the absolute pressure within said cabin will be maintained within the limits of a fixed proportion of the absolute pressure exterior of said cabin; and means responsive to the temperature of air exterior of said cabin for varying the action of said means responsive to absolute pressure to vary said proportion.

8. In a system for air-supercharging a cabin, the combination of: supercharging means for the cabin comprising means for delivering a flow of air into the cabin and emitting a flow of air from the cabin, the relative values of these flows determining the pressure within the cabin; and means for controlling the operation of said supercharging means comprising means responsive to the pressure of air affecting said cabin to control said supercharging means through a range of external pressures to which said cabin is exposed, and incorporating means responsive to absolute pressure inside said cabin to override said means which is responsive to pressure of air affecting said cabin and effectuate such control of said supercharging means so that the absolute pressure of air which it maintains in said cabin will not exceed a predetermined ratio of the absolute pressure of air outside said cabin, said means responsive to absolute pressure also having means for varying said ratio in accordance with the variations of temperature of the air outside said cabin.

9. In a system for air-supercharging a cabin, the combination of: air supply means for delivering air into the interior of the cabin from a source of air; outlet valve means adapted to be relatively opened and closed so as to vary the pressure of air in said cabin; opening power means actuatable to open said valve means; closing power means actuatable to close said valve means; compression-ration control means operative to actuate said opening power means whenever the absolute pressure in said cabin reaches a predetermined multiple of the absolute pressure of said source of air; means acting in response to changes in temperature of the air forming a part of said source of air to change the value of said predetermined multiple; and control means operating when said absolute pressure in said cabin is below said predetermined multiple to actuate said power means in response to changes in pressure of air affecting said cabin.

10. In an aircraft adapted to be supercharged, blower means for supplying air to a pressure tight cabin, control means for regulating the rate of air discharge from the cabin so as to control the pressure maintained therein, primary pressure regulator means adapted to controllably maintain pressure within said cabin below a predetermined pressure altitude, and secondary regulator means operating in response to the compression ratio existing between the air inside the cabin and the air outside the cabin approaching a value which would impair the efficiency of said blower means to override the action of said primary pressure regulator means and regulate the rate of air discharge from the cabin whereby the pressure of air within the cabin will be maintained within the limits of a maximum value wherein efficient operation of said blower means is obtainable.

11. In a cabin pressure regulator adapted to limit cabin pressure along a predetermined value of the absolute compression ratio, three pressure sensitive capsules, two of which are interconnected by means of joinder in tandem position with their outer ends fixed, these joint capsules consisting of one aneroid exposed to cabin pressure and a differential pressure capsule subjected to flight pressure and cabin pressure, the third capsule consisting of an aneroid exposed to cabin pressure and adjustable in its mounted position, a control operating member hinged to the third capsule and to said tandem capsules at a point contiguous to said means of joinder, and switch means adapted to be actuated by said member whenever a predetermined cabin compression ratio with respect to flight pressure is exceeded.

12. In a cabin pressure regulator adapted to limit cabin pressure along a predetermined value of the absolute compression ratio, three pressure sensitive capsules, two of which are interconnected by means of joinder in tandem position with their outer ends fixed, these joint capsules consisting of one aneroid exposed to cabin pressure and a differential pressure capsule subjected to flight pressure and cabin pressure, the third capsule consisting of an aneroid exposed to cabin pressure and adjustable in its mounted position, and a control operating member hinged to the third capsule and to said tandem capsules at a point contiguous to said means of joinder.

13. In an aircraft cabin adapted to be supercharged, a blower means for supplying air under pressure to said cabin, a valve means interposed in the wall of said cabin to vary the rate of air discharge of said cabin, a regulator means adapted to control pressure through controlling the action of said outlet valve, said regulator means comprising aneroid means responding to pressure within the cabin to control cabin pressure at a predetermined constant value, a differential pressure capsule subjected to cabin pressure and flight pressure arranged to override said aneroid means when a predetermined cabin differential pressure is exceeded, and a second aneroid means subjected to ambient flight pressure and adapted to coact with said differential pressure capsule to reduce the limiting value of differential pressure whenever said aircraft is flown above a predetermined flight altitude, the said influence on the differential pressure limit being such that cabin pressure is limited to and controlled along a schedule practically conforming to a predetermined ratio of the absolute pressures in the cabin with respect to flight altitude pressure.

14. In an aircraft cabin adapted to be supercharged, a blower means for supplying air under pressure to said cabin, a valve means interposed in the wall of said cabin to vary the rate of air discharge of said cabin, a regulator means adapted to control pressure through controlling the action of said outlet valve, said regulator comprising aneroid means adapted to control cabin pressure at a predetermined constant value, a differential pressure capsule subjected to cabin pressure and flight pressure arranged to override said aneroid means when a predetermined cabin pressure differential is exceeded, and a second aneroid means subjected to flight pressure and adapted to influence said differential pressure capsule to reduce the limiting value of differential pressure whenever said aircraft is flown above a predetermined flight altitude, the said influence on the differential pressure limit being such that cabin pressure is limited to and controlled along a schedule practically conforming to a predetermined ratio of the absolute pressures in the cabin with respect to flight altitude pressure; and means responsive to temperature to vary the value of said predetermined ratio.

15. In an aircraft cabin adapted to be supercharged, a blower means for supplying air under pressure to said cabin, a valve means interposed in the wall of said cabin to vary the rate of air discharge of said cabin, a regulator means adapted to control cabin pressure through the action of said outlet valve to said regulator comprising an aneroid adapted to control cabin pressure at a predetermined constant value, a differential pressure capsule subjected to cabin pressure and flight pressure arranged to override said aneroid when a predetermined cabin pressure differential is exceeded, said aneroid being arranged adjacent said differential pressure limiting means so that expansion of the aneroid when cabin pressure is reduced below a predetermined value will impose a reduction in the limiting differential pressure whereby cabin pressure is limited to and controlled along a schedule practically conforming to a predetermined ratio of the absolute pressures in the cabin with respect to flight; and means operating in response to changes in temperature to vary the value of said predetermined ratio.

16. Mechanism to control ventilation through and pressure within an aircraft cabin whereinto air is supplied under pressure, comprising means to control the flow of air through the cabin, absolute-pressure sensitive means operatively connected thereto to maintain cabin pressure substantially constant throughout a medium altitude range, differential-pressure sensitive means also operatively connected thereto to maintain a substantially constant differential of cabin pressure over atmospheric pressure throughout a higher altitude range, and means operable in accordance with a selected ratio between cabin absolute pressure and atmospheric pressure, also operatively connected to the flow-controlling means, to maintain such ratio substantially constant throughout the highest altitude range.

17. In an aircraft cabin adapted to be supercharged; a blower means for supplying air under pressure to said cabin; a valve means interposed in the wall of said cabin to vary the rate of air discharge of said cabin; a regulator means adapted to control cabin pressure through the action of said outlet valve; said regulator comprising an aneroid responsive to changes in pressure within the cabin operable to regulate said valve means to control cabin pressure at a predetermined constant value; and a differential pressure capsule responsive to the difference between cabin pressure and atmospheric pressure operative to override the control of said aneroid when a predetermined cabin differential pressure is exceeded; said aneroid being arranged adjacent to said differential pressure capsule whereby expansion of the aneroid, when cabin pressure is reduced below a predetermined value will, progressively limit the action of said differential pressure capsule to increase cabin pressure, thereby progressively decreasing the cabin differential pressure as the cabin absolute pressure decreases to maintain the cabin absolute pressure in accordance with a predetermined ratio between cabin absolute pressure and atmospheric absolute pressure.

18. Mechanism to control ventilation through and pressure within an aircraft cabin whereinto air is continually supplied under pressure, comprising: an outflow valve normally open at all altitudes; and three devices operatively connected to the valve to regulate its opening through three different altitude ranges, said devices comprising, respectively, an absolute-pressure sensitive means tending to maintain constant cabin pressure throughout a medium altitude range, a differential-pressure sensitive means tending to maintain a constant differential of cabin pressure over atmospheric pressure throughout a higher altitude range, and a ratio-sensitive means tending to maintain a constant ratio between cabin pressure and atmospheric pressure throughout the highest altitude range.

19. Mechanism to control ventilation through and pressure within an aircraft cabin whereinto air is continually supplied under pressure, comprising: means to effect and control outflow from the cabin; and at least two means operatively connected to the outflow-controlling means to regulate outflow; the first of said regulating means being responsive to cabin pressure and operable to effect elevation of cabin pressure over atmospheric pressure; and the second being operable in accordance with a selected ratio of cabin pressure to atmospheric pressure, and arranged to override the first regulating means to regulate cabin pressure in accordance with such ratio.

20. Mechanism to control ventilation through and pressure within an aircraft cabin whereinto air is continually supplied under pressure, comprising: means to effect and control outflow from the cabin; and at least two means operatively connected to the outflow-controlling means to regulate outflow; the first of said regulating means being responsive to cabin pressure and operable to maintain the cabin pressure substantially constant; and the second being operable in accordance with a selected ratio of cabin pressure to atmospheric pressure, and arranged to assume control over all other regulating means to regulate cabin pressure in accordance with such ratio.

21. Mechanism to control ventilation through and pressure within an aircraft cabin whereinto air is continually supplied under pressure, comprising: means to effect and control outflow from the cabin; and at least two means operatively connected to the outflow-controlling means to regulate outflow; the first of said regulating means being operable in accordance with the differential of cabin pressure over atmospheric pressure, to maintain such differential substantially constant; and the second being operable in accordance with a selected ratio of cabin pressure to atmospheric pressure, and arranged to override all other regualting means to regulate cabin pressure in accordance with such ratio.

22. In combination with a substantially airtight aircraft cabin of selected resistance to bursting, and having an outflow port; a blower of selected compression ratio connected for continual supply of air under pressure within the cabin; valve means controlling outflow from and hence pressure within the cabin; and at least two means operatively connected to the valve means to regulate cabin pressure; one of said regulating means being sensitive to the differential of cabin pressure over atmospheric pressure, and always active to prevent the attainment of a differential in excess of the selected bursting stress, within a given margin of safety; and the other of said regulating means being operable to regulate cabin pressure in accordance with a ratio of cabin pressure to atmospheric pressure always at least as low as the blower compression ratio.

23. The combination of claim 22, wherein the last-mentioned means is directly sensitive to cabin pressure and to atmospheric pressure, in ratio equal to the selected blower compression ratio.

24. A system for the control of airflow through an aircraft cabin which has an inflow port and an outflow port, comprising: a blower of selected compression ratio connected to discharge compressed atmospheric air within the cabin through such inflow port; means to regulate outflow through such outflow port, to maintain continual outflow and to establish cabin pressure at a value in excess of atmospheric pressure; means sensitive to the pressure difference thus created to automatically control said outflow-regulating means; and means operable under the joint influence of cabin pressure and atmospheric pressure compensatingly to control the outflow-regulating means to limit the pressure difference so that the ratio of cabin pressure to atmospheric pressure thus established never tends to exceed the blower's selected compression ratio.

25. Means to regulate the pressure within an aircraft cabin, comprising: valve means to control outflow from the cabin, and consequently the cabin pressure; differential-pressure sensitive means operatively connected to said valve means to adjust the same, and thereby to automatically prevent the cabin pressure exceeding atmospheric pressure by more than a selected differential pressure value; and means automatically operable in accordance with a selected ratio of cabin pressure to atmospheric pressure to adjust the differential-pressure sensitive means to limit the cabin pressure further, and thereby to prevent such selected ratio of cabin pressure to atmospheric pressure being exceeded.

26. Mechanism to control aircraft cabin pressures comprising, in combination with means to supply air under pressure within the cabin; an outflow valve movable to regulate pressure within the cabin; pressure responsive means operatively connected to move said valve to regulate the degree of elevation of cabin pressure over exterior pressure; and means operable in accordance with a selected ratio of cabin pressure to atmospheric pressure, and operatively connected to said valve to overrride said pressure responsive means and to effect opening movement of said valve to prevent cabin pressure exceeding atmospheric pressure by more than said selected ratio of such pressures.

27. Mechanism to control ventilation through and pressure within an aircraft cabin whereinto air is continually supplied under pressure, comprising: an outflow valve open at all pressures for continuous outflow; a pressure-sensitive means operatively connected to said valve to vary its opening and thereby to maintain cabin pressure elevated above atmospheric pressure; and further pressure-sensitive means operatively connected to modify the action of said first pressure-sensitive means, and thereby to prevent the ratio of cabin pressure to atmospheric pressure exceeding a selected value.

28. Means to regulate aircraft cabin pressure, comprising: a blower to supply air under pressure to the cabin; a valve arranged to control outflow therefrom; actuating means operatively connected to the valve; control means operatively associated with said actuating means, and subject to a difference of cabin pressure over atmospheric pressure, said actuating means and said control means being organized and arranged to open the valve increasingly with decrease of atmospheric pressure after the ratio of cabin pressure to atmospheric pressure reaches a selected value, thereby to prevent such ratio exceeding such value.

29. Mechanism to control flow of air through an aircraft cabin, comprising: means to supply within the cabin atmospheric air compressed a selected maximum compression ratio; a valve movable to control flow of air through the cabin; and means operable in accordance with a selected ratio between cabin pressure over atmospheric pressure to move said valve for maintaining a pressure difference of cabin pressure over atmospheric pressure such that the ratio of cabin pressure to atmospheric pressure will never tend to exceed such selected maximum compression ratio of said air supply means, for supply to the cabin of a substantial quantity of air by said air supply means at all flight altitudes.

30. Mechanism to regulate aircraft cabin pressure, comprising: means to supply within the cabin atmospheric air compressed at a selected maximum compression ratio; means regulating flow of air through the cabin; and control means operable to govern said flow regulating means as the aircraft ascends through a lower altitude range to increase the differential of cabin pressure over atmospheric pressure, and as the airplane ascends to a higher altitude range operable to decrease the differential of cabin pressure over atmospheric pressure, so that the ratio of cabin pressure to atmospheric pressure will not exceed the selected maximum compression ratio of said air supply means, thereby enabling said air supply means to deliver to the cabin a substantial quantity of air in such high altitude range.

31. Mechanism to regulate aircraft cabin pressure, comprising: an outflow valve; an actuator operatively connected to move the valve, and thereby varying the rate of discharge of air from said cabin; and a control means operable automatically in accordance with the ratio of cabin pressure to atmospheric pressure, operatively connected to regulate the resultant of the forces acting upon said actuator, and thereby the position of the valve and the cabin pressure, and to prevent the difference of cabin pressure over atmospheric pressure exceeding a value corresponding to a selected ratio of cabin pressure to exterior pressure.

32. In a control mechanism for a valve for controlling the relationship of fluid pressures within a container to pressures outside the same, a first pressure responsive means subjected to internal pressure and movable in one direction in response to increase thereof, a second pressure responsive means subjected oppositely to internal and external pressures and movable in one direction in response to increase in the differential of internal over external pressure, a third pressure responsive means subjected to external pressure and movable in one direction in response to decrease thereof, valve means controlling the flow of fluid between the interior and exterior of the cabin, and means to operate the valve means from said pressure responsive means, said operating means including connections to subject the valve means to operation by the first or the second pressure responsive means, independently of each other so that the valve means responds to the first pressure responsive means so long as the resulting pressure does not exceed the maximum differential, and then responds to the second pressure responsive means, and said operating means including connections to cause the third pressure responsive means to supplement the moving force of the second pressure responsive means to effect a maximum ratio of internal to external pressure and to operate the valve means when internal pressure exceeds said maximum.

33. In a mechanism of the kind described for controlling the relationship of fluid pressures within a container to pressures outside the same, a housing having a first and a second chamber therein, the first chamber being subjected to internal pressure and the second to external pressure, a first pressure responsive means in the first chamber resistingly movable in response to changes in internal pressure, a second pressure responsive means in the second chamber, means applying internal pressure to said second pressure responsive means so that it moves in response to a difference in internal and external pressures, a third pressure responsive means in the second chamber movable in response to changes in external pressures, valve means adapted to be operated by said pressure responsive means, and controlling fluid flow between the interior and exterior of the container, and connections between the first and second pressure responsive means and the valve means to effect operation of the latter upon movements aforesaid of the said two pressure responsive means, and connections to cause the third pressure responsive means to coact with the second pressure responsive means when external pressure decreases below a predetermined value, whereby the valve means is operated to maintain a maximum ratio of internal to external pressure.

34. Mechanism to control ventilation through and pressure within a sealed aircraft cabin, comprising: means for delivering air under pressure into said cabin; means to control the flow of air through the cabin; means operatively connected to said flow control means to maintain cabin pressure at a value in excess of atmospheric pressure; and at least two pressure change sensitive instruments constantly sensing the changes in cabin absolute pressure and flight absolute pressure as said aircraft ascends and operatively interconnected to coact, upon the attainment by said aircraft of an altitude at which the ratio of cabin absolute pressure to flight absolute pressure is a selected ratio less than the compression ratio of said air delivering means, to thereafter operate said flow controlling means to so regulate the flow of air through the cabin as to maintain said selected ratio substantially constant as said aircraft ascends higher than said altitude whereby said air delivering means is maintained operative to deliver air into said cabin at all altitudes.

35. Mechanism to control ventilation through and pressure within a sealed aircraft cabin, comprising: means for delivering air under pressure into said cabin; an outflow valve controlling the flow of air from the cabin; means for operating said valve to vary the rate of discharge of air from said cabin; means operatively connected to said valve operating means to maintain cabin pressure at a value in excess of atmospheric pressure; and at least two pressure change sensitive instruments constantly sensing the changes in the ratio of cabin absolute pressure to flight absolute pressure as said aircraft ascends and operatively interconnected to coact, upon the attainment by said aircraft of an altitude at which the ratio of cabin absolute pressure to flight absolute pressure is a selected ratio less than the compression ratio of said air delivering means, to thereafter operate said valve operating means to so regulate the rate of discharge of air from the cabin as to maintain said selected ratio substantially constant as said aircraft ascends higher than said altitude.

BRUCE E. DEL MAR.

REFERENCES CITED

The following references are of record in the file of this patent:

UNITED STATES PATENTS

| Number | Name | Date |
|---|---|---|
| 1,562,663 | Strong | Nov. 24, 1925 |
| 2,002,057 | Gregg | May 21, 1935 |
| 2,208,554 | Price | July 16, 1940 |
| 2,265,461 | Wagner | Dec. 9, 1941 |
| 2,284,984 | Nixon et al. | June 2, 1942 |
| 2,407,257 | Del Mar | Sept. 10, 1946 |
| 2,407,258 | Del Mar | Sept. 10, 1946 |
| 2,407,540 | Del Mar | Sept. 10, 1946 |
| 2,435,819 | Crever et al. | Feb. 10, 1948 |
| 2,461,415 | Dube | Feb. 8, 1949 |

FOREIGN PATENTS

| Number | Country | Date |
|---|---|---|
| 521,623 | Great Britain | May 27, 1940 |